United States Patent
Guarisco, Sr. et al.

(10) Patent No.: US 7,131,803 B2
(45) Date of Patent: Nov. 7, 2006

(54) MULTILENGTH TUBULAR TRANSPORTER

(75) Inventors: Leonard J. Guarisco, Sr., Morgan City, LA (US); Leonard J. Guarisco, Jr., Morgan City, LA (US); Patrick D. Guarisco, Berwick, LA (US)

(73) Assignee: Paragon Industries, Inc., Morgan City, LA (US)

( * ) Notice: Subject to any disclaimer, the term of this patent is extended or adjusted under 35 U.S.C. 154(b) by 0 days.

(21) Appl. No.: 10/678,585

(22) Filed: Oct. 2, 2003

(65) Prior Publication Data

US 2005/0074307 A1 Apr. 7, 2005

(51) Int. Cl.
*B60P 7/08* (2006.01)
(52) U.S. Cl. ............ 410/35; 410/32; 410/34; 410/36; 410/46; 410/100
(58) Field of Classification Search .......... 410/31, 410/32, 34, 36, 37, 39, 40, 42, 35, 46, 100; 220/1.5; 108/53.1, 55.1, 55.5, 56.1, 57.17, 108/51.11
See application file for complete search history.

(56) References Cited

U.S. PATENT DOCUMENTS

| | | | | | |
|---|---|---|---|---|---|
| 2,059,390 | A | * | 11/1936 | Pagel | 410/36 |
| 2,946,563 | A | * | 7/1960 | Eaton | 410/37 |
| 3,263,830 | A | * | 8/1966 | Anderson | 410/36 |
| 3,438,519 | A | * | 4/1969 | Flake | 414/787 |
| 3,458,215 | A | * | 7/1969 | Maradyn | 410/37 |
| 3,809,234 | A | * | 5/1974 | Kurick | 206/448 |
| 4,036,476 | A | * | 7/1977 | Douce et al. | 410/34 |
| 5,351,827 | A | * | 10/1994 | Baka | 206/443 |
| 6,182,837 | B1 | * | 2/2001 | Crabtree | 211/59.4 |
| 6,599,069 | B1 | * | 7/2003 | Ross | 410/36 |
| 2002/0009345 | A1 | * | 1/2002 | Clive-Smith | 410/32 |

OTHER PUBLICATIONS

Promotional information on "Tubular Transportation Frames," manufactured by Ferguson Seacabs Limited, at http://www.fergusonmodular.co.uk/downloads/pdf/TubularTransport.pdf. No date of publication, although present on web site at least since Aug. 2003.

* cited by examiner

*Primary Examiner*—Stephen Gordon
(74) *Attorney, Agent, or Firm*—Adams and Reese LLP (57) ABSTRACT

A multilength tubular transporter is provided, comprising a base frame, including at least two main beams, wherein the main beams are connected by a plurality of cross members, a floor substantially covering the areas defined by the main beams and cross members; a plurality of substantially vertical guide members connected to each of the main beams; a lifting arrangement operatively connected to the base frame for enabling the transporter to be lifted to and from a vehicle; a stacking device operatively connected to the base frame for engaging the guide members of a second transporter, wherein the transporters may be securely stacked; and wherein the base frame includes one or more winches for securing tubulars within the transporter.

17 Claims, 12 Drawing Sheets

MULTILENGTH TUBULAR TRANSPORTER

BACKGROUND OF THE INVENTION

I. Field of the Invention

The present invention relates generally to the loading, transportation, and unloading of pipe and tubing, and more particularly to devices used to transport such pipe and tubing.

II. Background and Prior Art

In the oilfield industry and many other industries, a wide variety of pipes and tubes (hereinafter "tubulars") are used. Tubulars are often loaded directly onto flatbed trailers and stacked with divider boards in between the layers, and they are typically retained on the trailer by a series of vertical posts inserted into the outer edge of the trailer. When the tubulars are loaded or unloaded, they are moved only a few items at a time by forklift or crane, each time having to raise the tubulars above the side posts to clear the trailer. If the tubulars are being unloaded for use at their final destination, they are usually moved onto nearby pipe racks and stacked in similar fashion. This method of loading and unloading is widely accepted as the way such tasks must be performed, but it is a slow process, particularly when multimodal forms of transportation are required or when the tubulars must be moved several times before reaching their final destination.

For example, a typical sequence of events for moving tubulars may involve the following steps: (1) removal from a supplier's pipe rack, (2) placement of the tubulars onto a flatbed trailer or transport to a ship, (3) removal of the tubulars from the flatbed trailer, (4) placing the tubulars on a pipe slinging rack for pre-slinging into manageable bundles, (5) loading the pre-slung bundles of tubulars into special divider racks which are set up on the ship for transportation to a site, such as an oil platform, (6) removal of the tubulars from the ship, and (7) placement of the tubulars onto a pipe rack on the oil platform. In the foregoing simple example, and at each step of the loading and unloading process, tubulars are moved only in small batches. The divider racks on the ship must be set up each time tubulars are transported, and the racks remain on the deck of the ship after tubular removal. Therefore, the deck of the ship is unusable for anything other than tubular transport for the return trip. It can readily be seen, therefore, that in more complex shipping arrangements, this manual handling process can take quite some time. This is particularly problematic when participants in the shipping process are not immediately ready to transport the items, and the tubulars must be removed from the previous vehicle and temporarily stored.

The disadvantages of the aforementioned methods are many. First, as explained in the preceding example, the process of carefully moving small numbers of items is exceedingly slow, especially when each load of tubulars on a vehicle is carried in several stacks. Second, because of the extensive amount of time required to manually move tubulars from place to place, it can be an unduly expensive operation. In smaller jobs requiring a relatively small number of items, the expense of moving tubulars is often prohibitively expensive. Finally, as loading and unloading frequency increases, so does the risk that accidents will happen as tubulars are moved. For example, the movement of pipes to and from pipe racks often requires a person on top of the pipe rack to assist the forklift or crane operator in nudging the pipes to and from the rack, many times leading to injuries from tripping or falling.

A solution to the current methods of moving tubulars must be directed toward shortening the time required to move a given batch of tubulars from one place to another, particularly when multiple transfers must occur. As explained above, reducing the loading and unloading time carries immediate benefits in terms of decreased cost and decreased risk of personal injury.

One attempt to solve the foregoing problems has been made by a company in Scotland, Ferguson Seacabs, Ltd., in the form of tubular transportation frames. Such frames are helpful in minimizing time and costs of shipping, because the tubulars are contained within a portable frame which can be moved as a unit to and from each transportation vehicle. Because the frame includes forklift tubes in the base, it reduces the use of cranes. The frames are stackable, and they permit the containment of differing sizes of tubulars within the same frame. However, the Ferguson frames have a number of notable deficiencies. First, there is no integrated winch and strap assembly for use in securing a loaded frame, ostensibly because it relies upon an upper bar to mechanically lock the tubulars in place. Second, it does not provide full-length support for longer tubulars, resulting in possible damage to the exposed ends of the tubulars and their threads. Third, the Ferguson frames are not structurally capable of handling larger payloads in the range of 50,000 pounds. Fourth, the reliance on a four-point contact as the frames are stacked is less preferable to a more stable and redundant arrangement. Fifth, the divider elements between layers of tubulars in the prior frames are elastomerically coated members which must be fabricated and supplied by the manufacturer, eliminating the option of using conventional and less expensive timber dividers. Finally, the Ferguson frames appear to be designed only for the transportation of tubulars, because there is no multi-purpose floor or other supporting surface to permit the transportation of other equipment.

Consequently, the present invention substantially improves upon the prior art by providing a complete, multilength tubular transporter which: (a) permits greater payloads, (b) includes more secure stackable features, (c) allows commonly available winching systems and dividers, (d) offers better protection for long tubulars, and (e) provides a multi-purpose floor for the transportation of a wide range of equipment and supplies.

SUMMARY OF THE INVENTION

Therefore, one object of the present invention is to provide a multilength tubular transporter which enables transport of tubulars having a wide range of lengths and diameters.

It is also an object of the present invention to provide a multilength tubular transporter which can be carried by conventional flatbed trailers.

A further object of the present invention is to provide a multilength tubular transporter which allows secure stackable storage of the transporters until needed.

Another object of the present invention is to provide a multilength tubular transporter which allows one-time loading of tubulars throughout the transportation cycle.

Still another object of the present invention is to provide a multilength tubular transporter which permits easy lifting by forklift or cables.

Another object of the present invention is to provide a multilength tubular transporter which provides substantially improved payload capacity, including the ability to transport a wide range of equipment and supplies.

Accordingly, a multilength tubular transporter is provided, comprising a base frame, including at least two main beams, preferably constructed from steel I-beams, wherein the main beams are connected by a plurality of cross members, also preferably constructed from steel I-beams; a floor substantially covering the areas defined by the main beams and cross members; a plurality of substantially vertical guide members connected to each of the main beams; means operatively connected to the base frame for enabling the transporter to be lifted to and from a vehicle; means operatively connected to the base frame for engaging the guide members of a second transporter, wherein the transporters may be securely stacked; and wherein the base frame includes winching means for securing tubulars within the transporter.

In a preferred embodiment, at least two cross members are constructed in the form of a tube shaped and dimensioned to permit the insertion of a fork of a forklift. Also, the main beams each include a plurality of stacking sockets aligned with and formed to receive guide members of a second transporter, and wherein each of the guide members includes a tapered cap shaped and dimensioned to enable insertion of the guide members into the stacking sockets. Each of the guide members includes a guide channel for receiving divider members between stacks of tubulars. Additionally, the guide members include a plurality of side support pads which are constructed of a material that minimizes deformation to tubulars carried within the transporter. Optionally, the side support pads may be constructed from an elastomeric material, and the floor may comprise a plurality of wooden planks attached to the cross members.

Preferably, the winching means comprises one or more winches positioned on one of the main beams, wherein the winch includes a strap connectable to the other main beam by way of a hook or other suitable connection. The I-beams used for the main beams are reinforced with a plurality of gussets extending between the upper and lower flanges of the I-beams. The transporter is preferably constructed substantially of steel and in a manner to impart a maximum level of rigidity to the transporter, and the dimensions of the transporter are sized to permit placement of the transporter onto a conventional flatbed trailer.

DETAILED DESCRIPTION OF THE PREFERRED EMBODIMENTS

Unless otherwise noted herein, all construction materials are preferably steel, and all attachments between such components are achieved by welding. Such materials and methods are intended to impart a maximum level of strength and structural rigidity, while keeping the transporter as lightweight and easy to maneuver as possible. Certain features which are used in assembling or operating the invention, but which are known to those of ordinary skill in the art and not bearing upon points of novelty, such as screws, bolts, nuts, welds, and other common fasteners, may not be shown for clarity.

Figure 1:
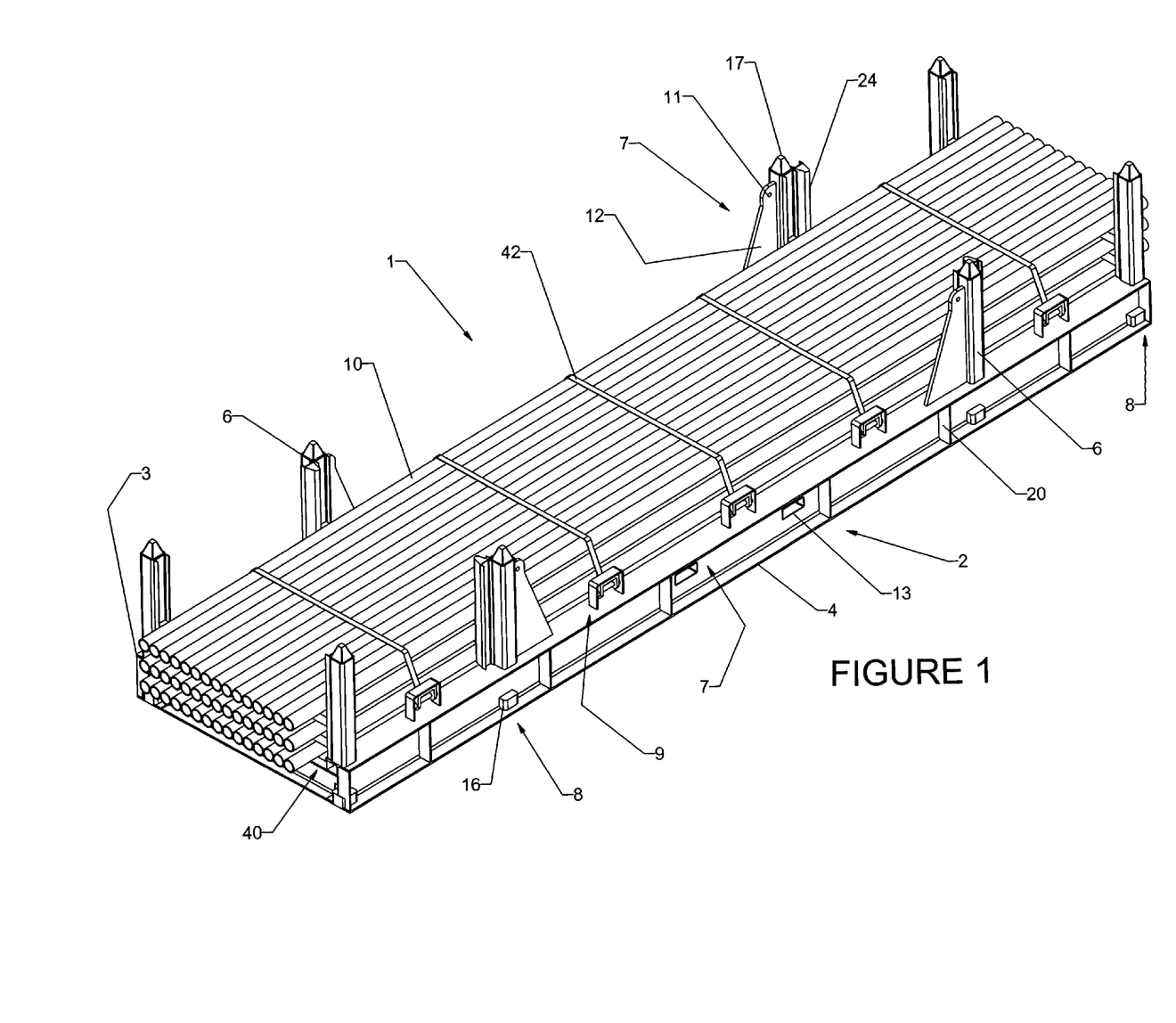
FIG. 1 is a perspective view of the present invention depicting a loaded tubular transporter.
Figure 2:
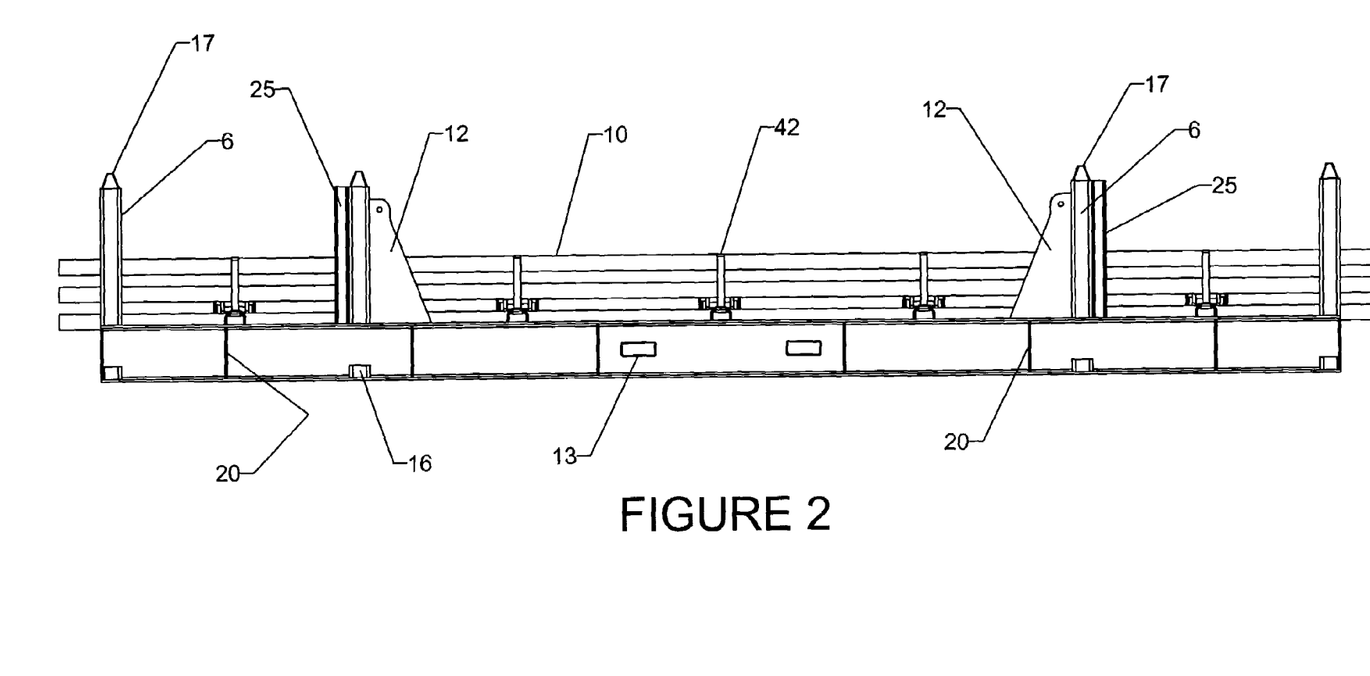
FIG. 2 is an elevation view of a loaded tubular transporter in accordance with the invention.
Figure 3:
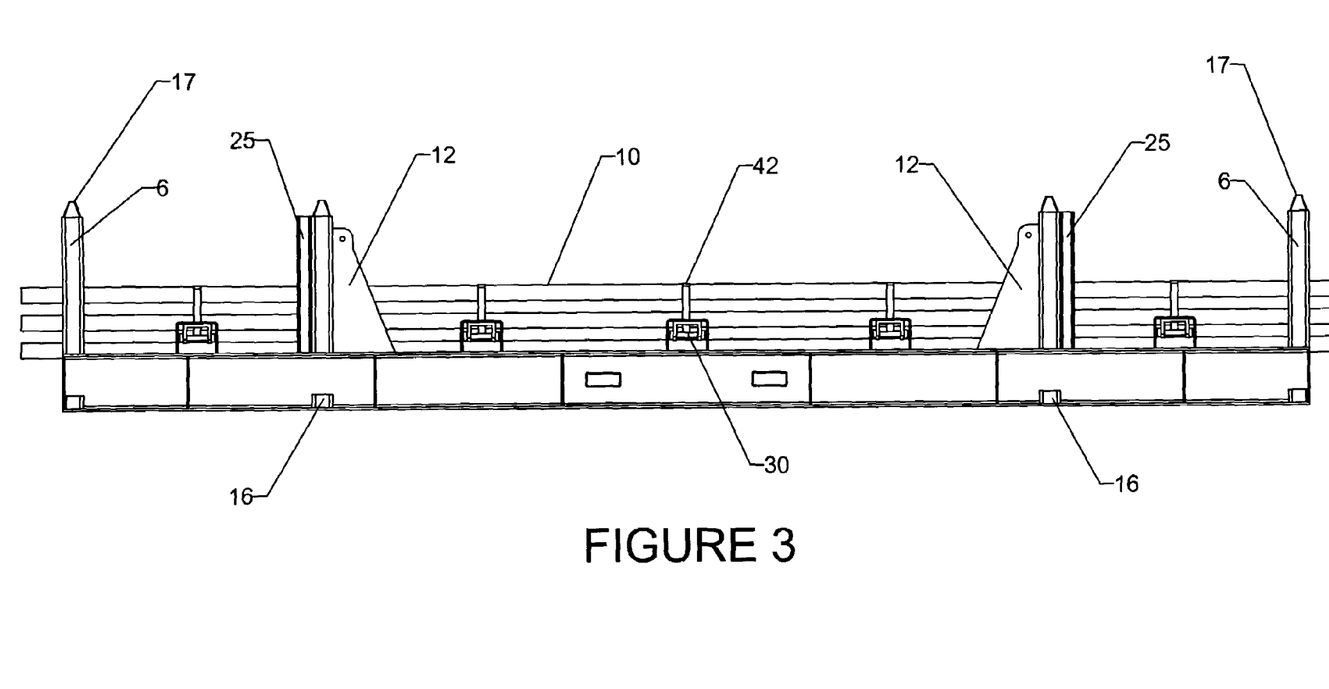
FIG. 3 is an elevation view of the opposite side of the loaded tubular transporter shown in FIG. 2.
Figure 4:
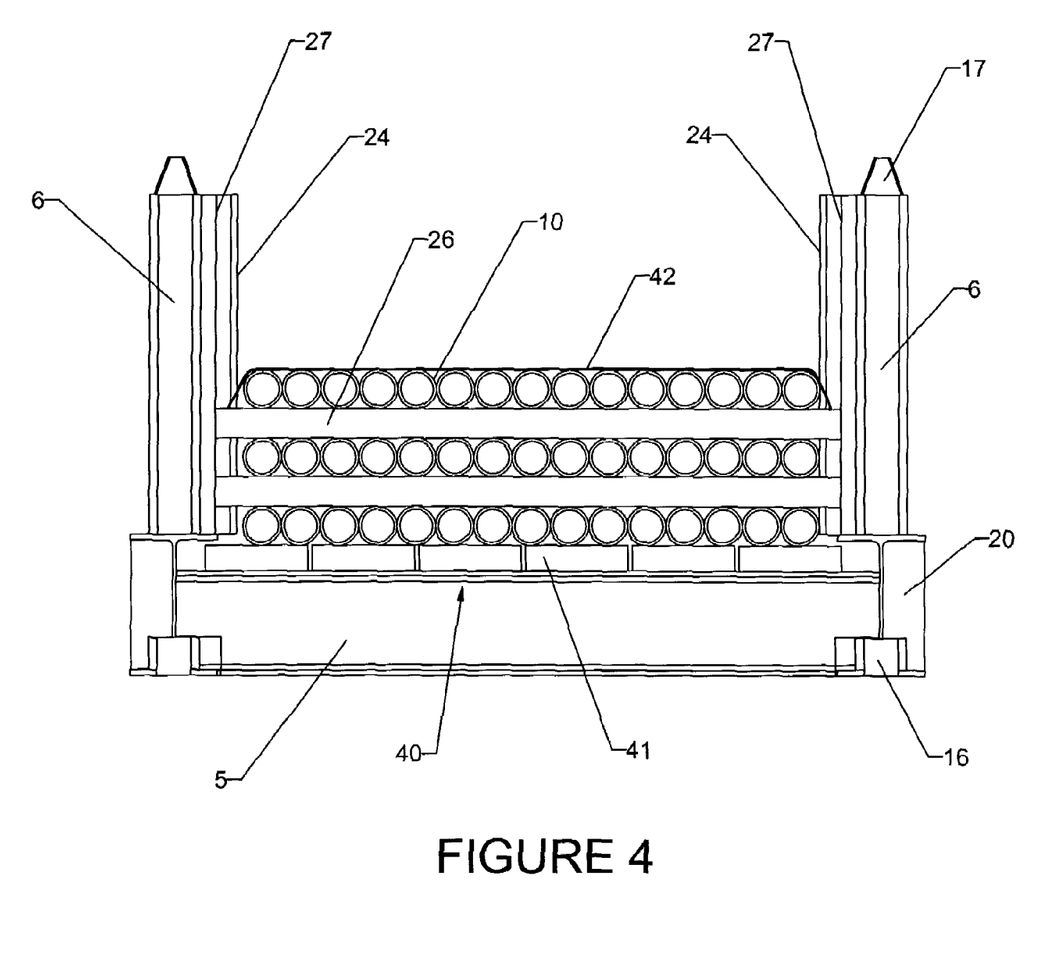
FIG. 4 is an end view of the loaded tubular transporter.
Figure 5:
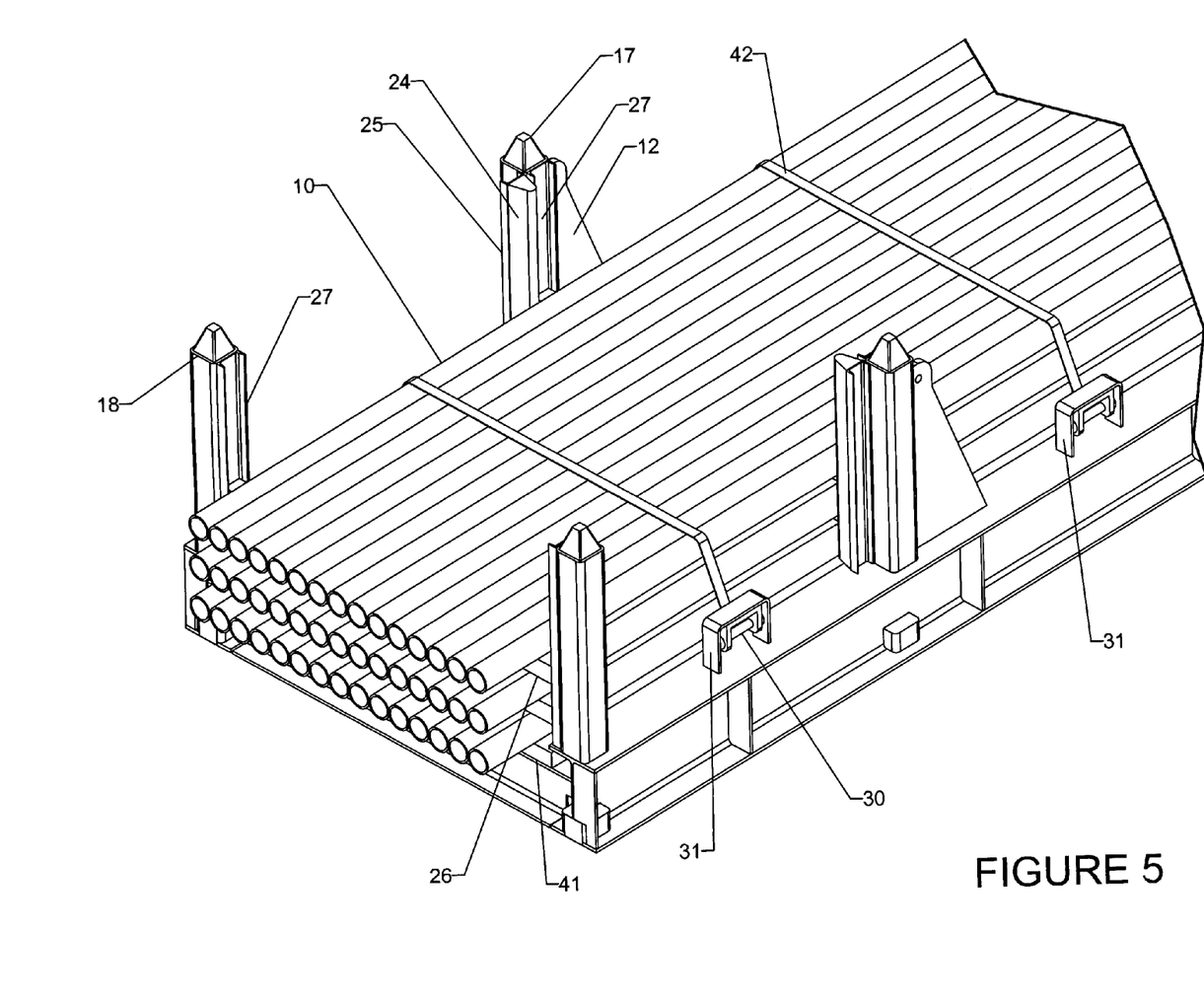
FIG. 5 is a detail perspective view of one end of the loaded tubular transporter.
Figure 6A:
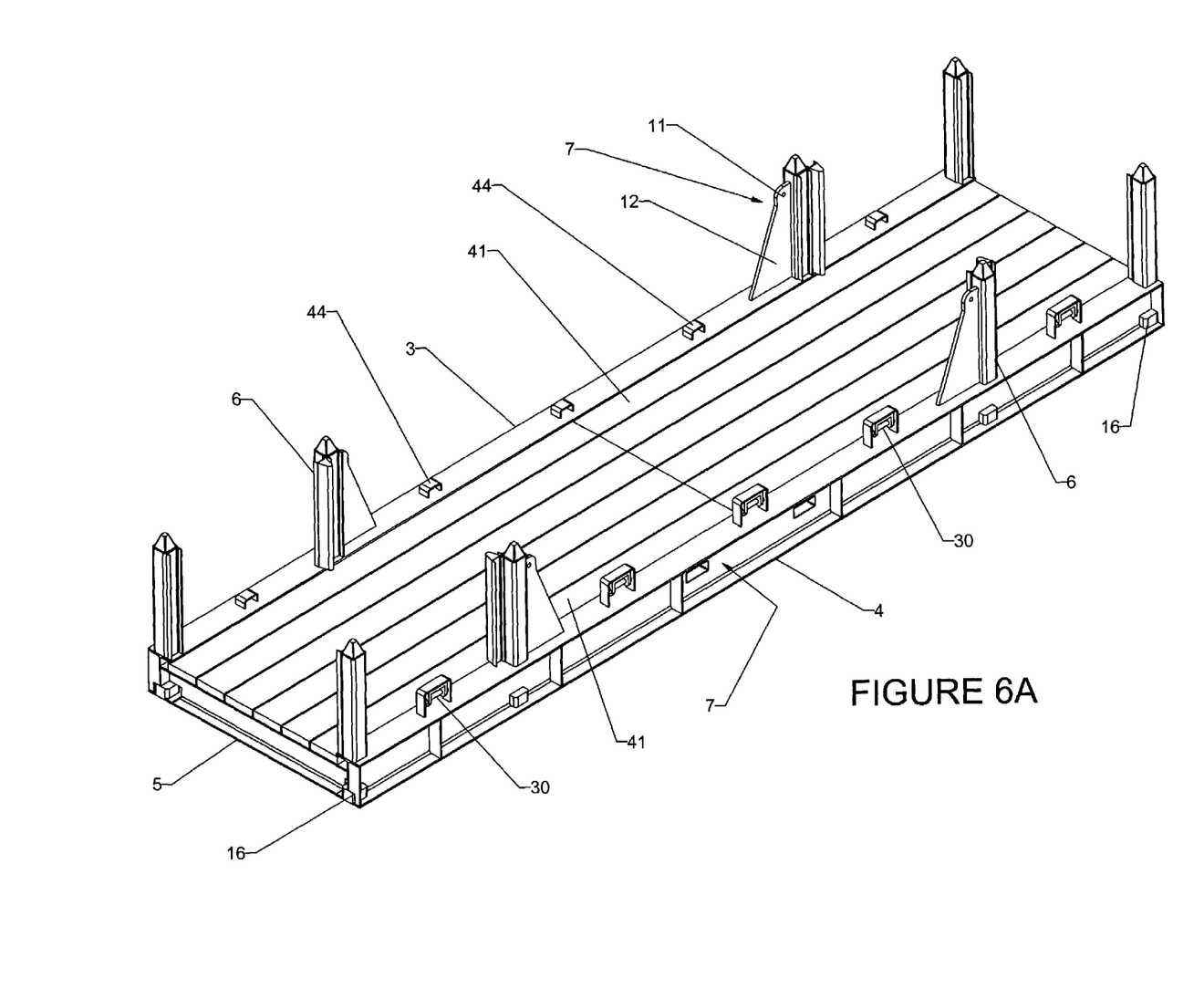
FIG. 6A is a perspective view of the tubular transporter in an unloaded state.
Figure 6B:
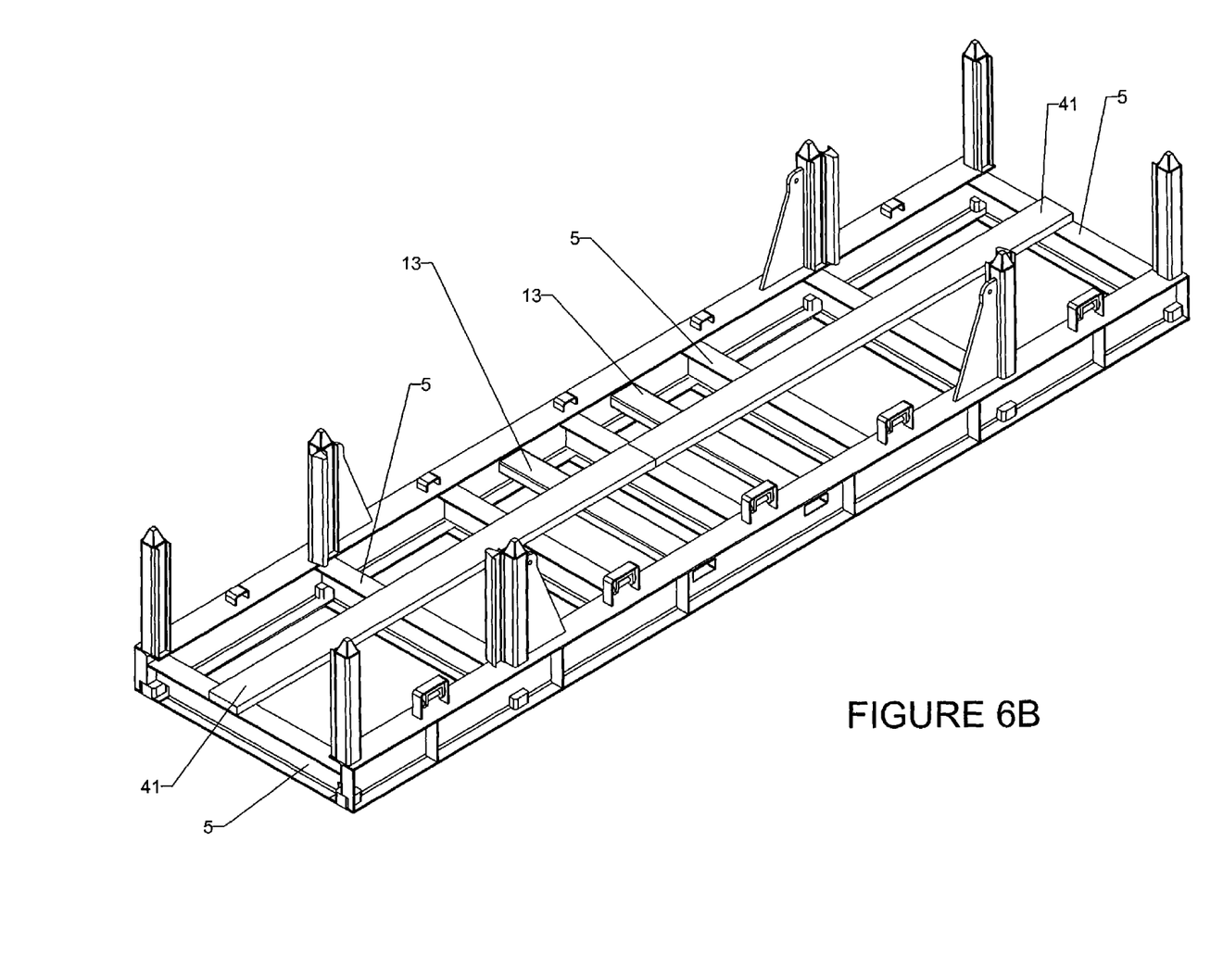
FIG. 6B is a perspective view of the tubular transporter depicting only a single row of flooring to expose the structural members.

Turning now to the figures, a multilength tubular transporter 1 is illustrated in FIG. 1 in a loaded condition as being generally comprised of a base frame 2, including at least two main beams 3,4 which are connected by a plurality of cross members 5. Each cross member 5 is preferably constructed from steel I-beams, such as a W12×45 wide flange I-beam, to achieve the desired structural rigidity. A floor 40 is attached to the base frame 2 and covers those areas which are defined by the main beams 3,4 and the cross members 5. Preferably, the floor 40 is comprised of a plurality of strong wooden planks 41, e.g. constructed from oak and having roughly a 12"×3" cross section. The planks 41 are advantageously secured to the upper flanges of the I-beam cross members 5 by standard nuts and bolts whose use and strength characteristics are well known to those of ordinary skill in the art. It should be understood that the floor 40 renders the present invention much more versatile than prior devices, because it enables the transporter 1 to carry not only tubulars 10, but also a wide range of equipment and supplies when the tubulars 10 are not present. The transporter 1 is also depicted in FIG. 6B in an unloaded condition in which some of the components may be shown with greater clarity. Detailed views of key components are further provided in FIGS. 5 and 7. The transporter 1 also includes a plurality of substantially vertical guide members 6 connected to each of the main beams 3,4, as well as means 7 operatively connected to the base frame 2 for enabling transporter 1 to be lifted to and from a vehicle. Also included are means 8 operatively connected to the base frame 2 for engaging the guide members 6 of a second transporter so that multiple transporters 1 may be securely stacked. Winching means 9 are also located on the base frame 2, preferably on one of the main beams 3,4 for securing tubulars 10 within the transporter 1. While a wide variety of tubular sizes can be accommodated by the transporter 1, the tubulars 10 which are encountered are usually in 32' and 45.5' lengths.

The transporter 1 may be lifted by either a forklift or a crane. When a crane is used, cables used with the crane may be connected in the conventional manner to the eyelets 11 formed into main gussets 12 attached to guide members 6 on at least four locations. When a forklift is used, at least two of the cross members 5 may be constructed from tubes 13 shaped and dimensioned to permit the insertion of forks of the forklift.

Figure 7:
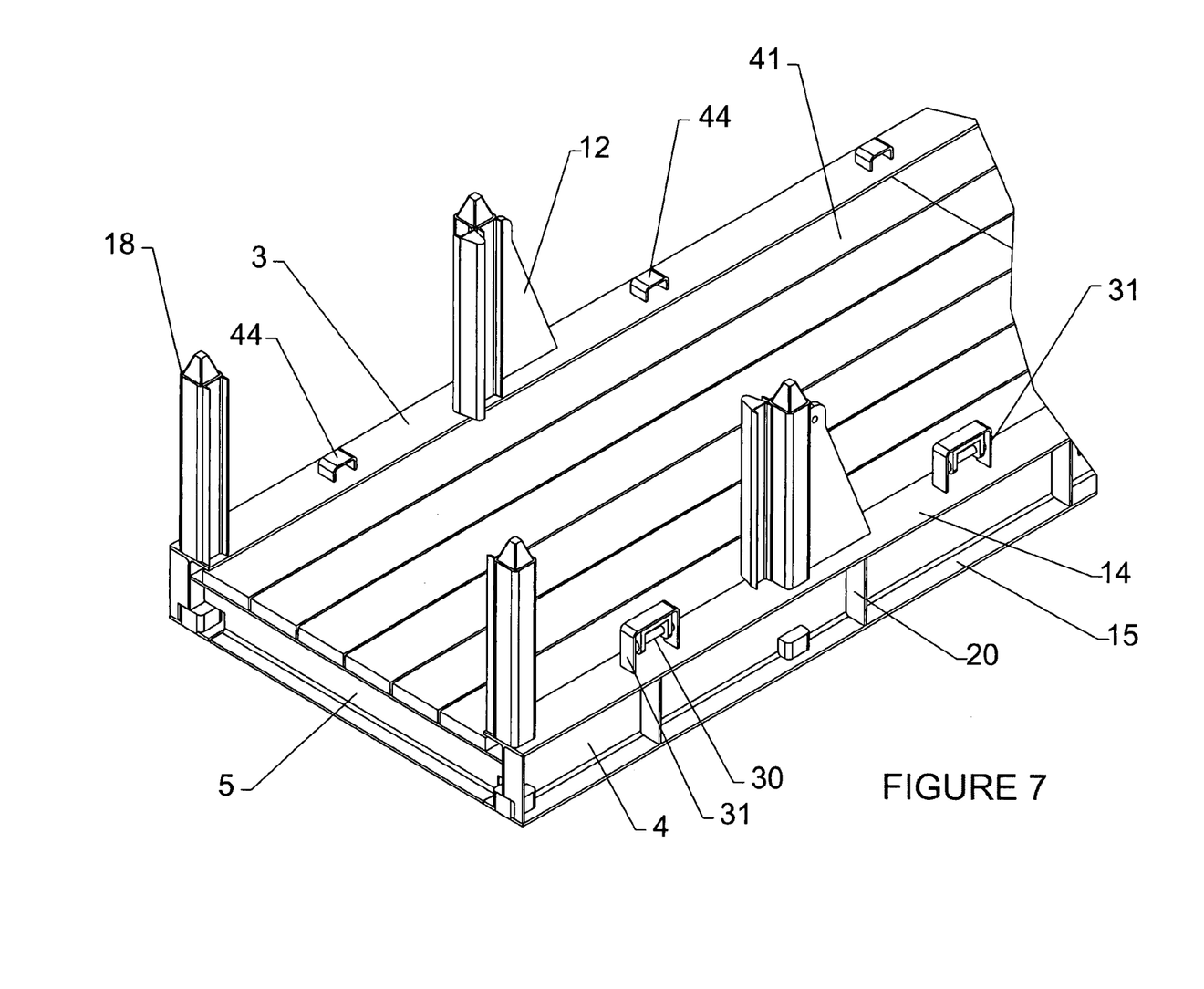
FIG. 7 is a detail perspective view of the unloaded tubular transporter of FIG. 6A.
Figure 8:
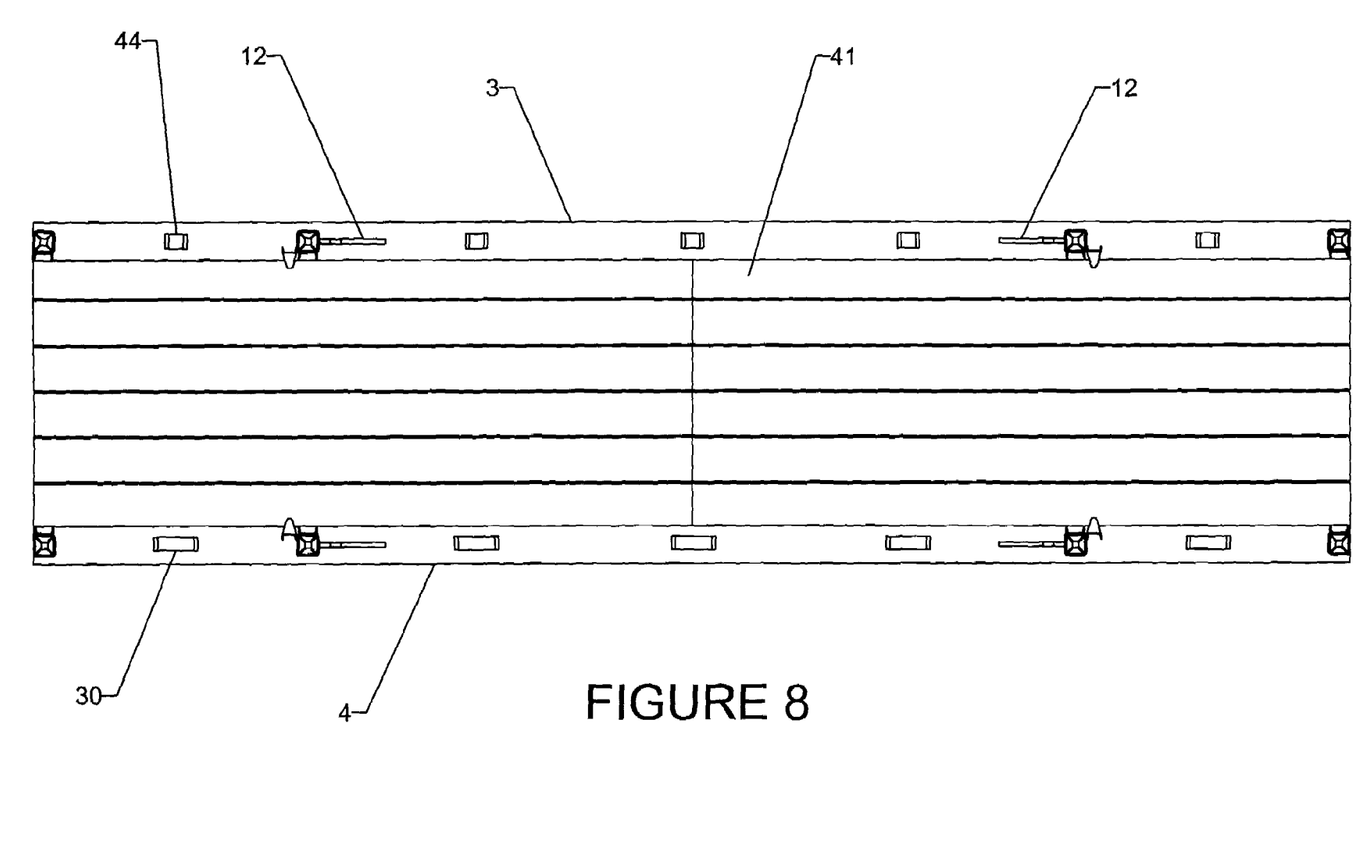
FIG. 8 is a top view of the unloaded tubular transporter.
Figure 9:
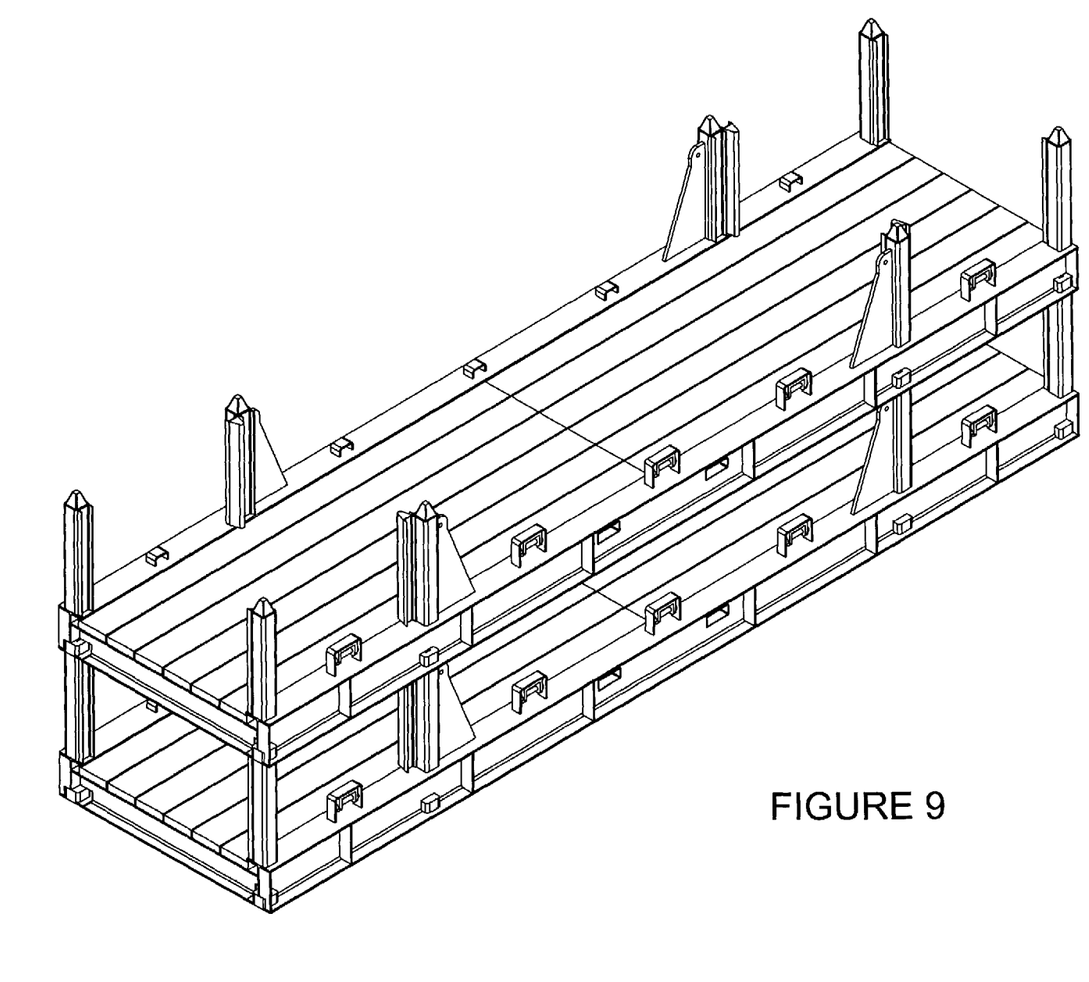
FIG. 9 is a view of the invention depicting the manner in which multiple transporters may be securely stacked.
Figure 10:
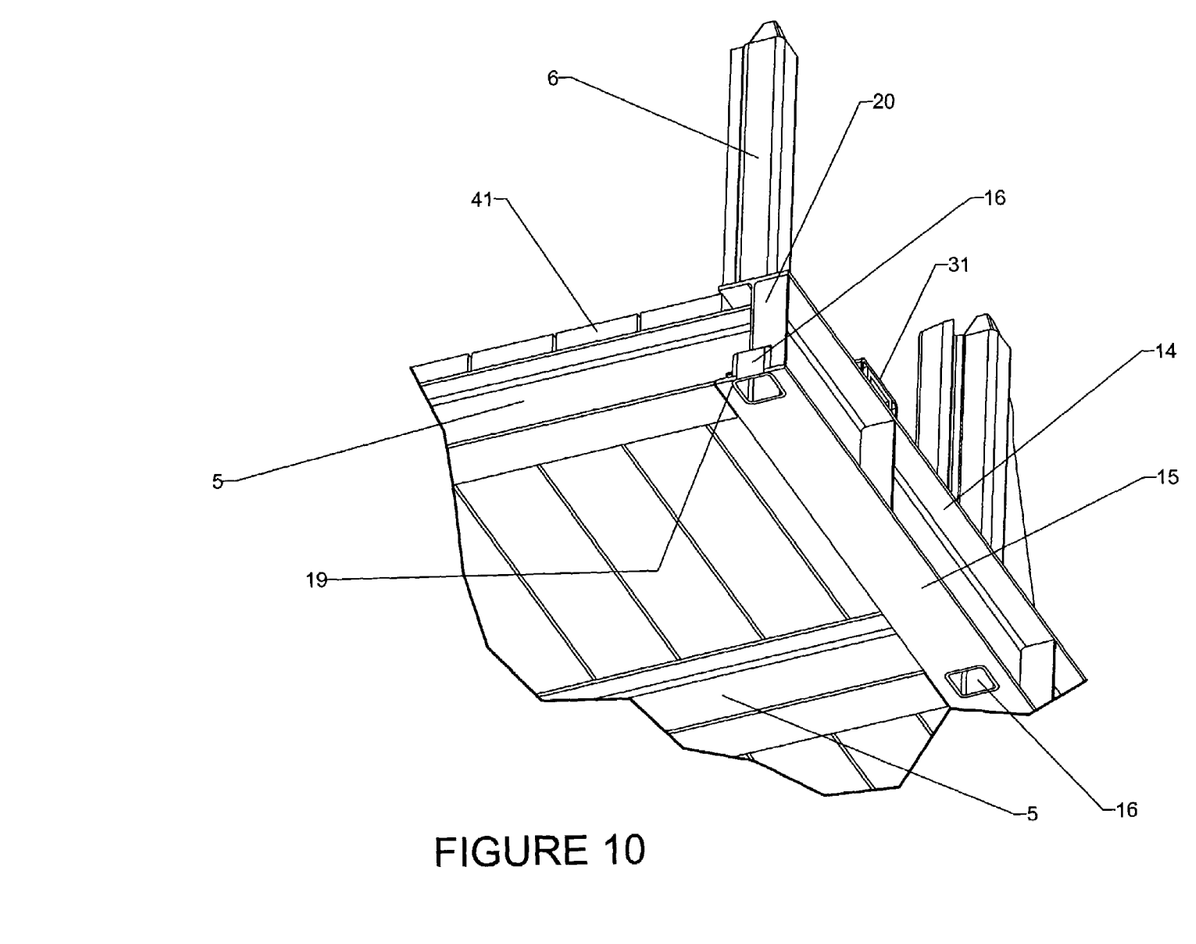
FIG. 10 is a detail view of the stacking sockets on the underside of the base frame.

As best shown in FIG 7, the main beams 3,4 are preferably constructed from conventional I-beams having upper and lower flanges 14,15. While the particular dimensions of the I-beams may vary, the W16×67 I-beam has been found suitable under most loading conditions. To accommodate the stacking of the transporters 1, each of the main beams 3,4 includes several stacking stacking sockets 16 aligned with and formed to receive the guide members 6 of another transporter 1. The stacking sockets 16 are each formed by cutting away material from the selected locations along the main beams 3,4 and inserting a capped portion of rectangular tubing, e.g. 6"×6"×½" ASTM A-500 GR.B, such that the open end faces downward. The stacking sockets 16 are then welded into place, ensuring that the open face is flush with the bottom of each main beam 3,4. Each guide member 6 includes a tapered cap 17 shaped and dimensioned to enable insertion of the cap 17 into the stacking sockets 16. The particular shape of cap 17 is not especially important, except that the taper is desired to aid in alignment of the guide members 6 with the stacking sockets 17 of another transporter 1. Also, the cap 17 should be affixed to the guide member 6 such that the terminal surface 18 remains unobstructed, and the height of the cap 17 above terminal surface 18 is substantially equal to the depth of the stacking socket 16. As shown best in FIGS. 7 and 10, guide members 6 are preferably constructed from the same size tubing stock used for the stacking sockets 16, e.g. 6"×6"×½" tubing, because a primary contact interface between the stacked transporters 1 is the terminal surface 18 of guide member 6 and the terminal surface 19 of stacking socket 16. Preferably, another contact point is the top of the cap 17 and the underside of the stacking socket 16, due to the equal height and depth, respectively, of those features. In the preferred embodiment depicted in the figures, the transporter 1 has eight guide members 6, each of which is alignable with an equal number of stacking sockets 16, such that eight points of contact between terminal surfaces 18,19 are provided to establish a safe and stable connection between stacked transporters 1.

The structural integrity of the transporter 1 may also be enhanced by several additional gussets 20. In the case of main beams 3,4 constructed from I-beams, the upper and lower flanges 14,15 may be reinforced by a plurality of gussets 20 extending between the upper and lower flanges 14,15. The particular size, number, and spacing of such gussets 20 will depend on a number of factors, such as overall length of the transporter, the size of the I-beams, and the like. Therefore, the extent to which such gussets 20 may be helpful in imparting further rigidity and strength is a determination to be made by engineers once all other design parameters are known.

With respect to the loading and transporation of tubulars 10, the transporter 1 includes a number of additional features designed to protect the items in transit. First, the floor 40 is constructed of a material that minimizes deformation to tubulars 10 carried within the transporter 1. Similarly, a plurality of side support pads 24 are connected to side support channels 25 (typically constructed from C 4×5.4) and then affixed adjacent to at least four of guide members 6, where the side support pads 24 extend the length of guide members 6. Side support pads 24 are also constructed of a material that minimizes deformation to tubulars 10 that are carried within the transporter 1. Typically, the side support pads 24 may simply comprise elastomeric bumpers obtainable from large suppliers such as McMaster-Carr, including Part No. 2195T63 or 2195T53 as suitable alternatives.

Figure 11:
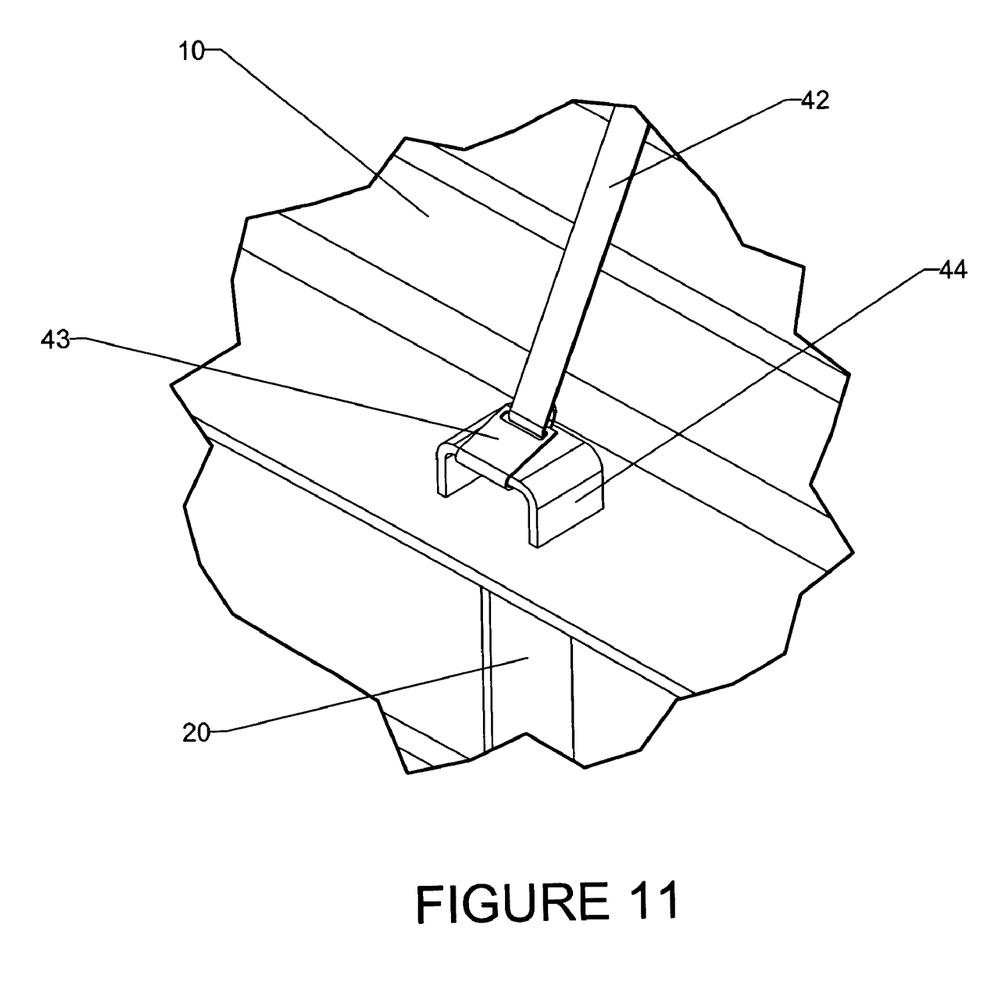
FIG. 11 is a detail perspective view of the strap hook and bracket connection.

When tubulars 10 are loaded into the transporter 1 in multiple stacks, they must be separated, which can be accomplished simply by wooden divider beams 26, which are preferably 4"×4" cross section oak beams. To retain the divider beams 26, divider channels 27 (typically C 5×6.7) are affixed to each of guide members 6, permitting divider beams 26 to be dropped into place and guided by the flanges on divider channels 27 into position on top of a layer of tubulars 10. Optionally, in order to permit easier forklift loading and unloading of the lowest layers of tubulars 10 from the transporter 1, additional divider beams 26 may be placed between tubulars 10 and the planks 41. In this manner, a gap would be created between the lowest layer of tubulars 10 and the floor 40 so as to permit insertion of the forks of the forklift. Once tubulars 10 are loaded onto the transporter 1, the winching means 9 may be used to secure the load. As is commonly understood in the art, winching means 9 simply comprises several winching mechanism 30 and strap 42 assemblies attached to one of the main beams 3,4. A suitable winch 30 for this application would be the McMaster-Carr Part No. 33545T11, although models having similar features may also be substituted. In a preferred arrangement, the winching mechanism 30 may be mounted to the underside of a inverted U-shaped bracket 31 which is welded to the top of the main beam 4. In this configuration, the functioning of the winching mechanism 30 will benefit from the gravity-locking feature common to winches of the type described above. As shown best in FIG. 11, each of the straps 42 includes a hook 43 which is connectable to an inverted U-shape bracket 44 welded to the main beam 3,4 opposite the winching mechanism 30.

As a general matter, the length, width and height of the transporter 1 are sized to permit placement of the transporter 1 onto a conventional flatbed trailer. Consequently, the maximum length of the transporter 1 should not normally exceed thirty feet. Although exemplary embodiments of the present invention have been shown and described, many changes, modifications, and substitutions may be made by one having ordinary skill in the art without necessarily departing from the spirit and scope of the invention.

We claim:

1. A multilength tubular transporter, comprising:
   (a) a base frame, including at least two main beams, wherein said main beams are connected by a plurality of cross members;
   (b) a plurality of substantially vertical guide members connected to each of said main beams, wherein each of said guide members includes a side support pad connected to said guide member, and wherein said side support pads are constructed of a material that minimizes deformation to tubulars carried within said transporter;
   (c) means operatively connected to said base frame for enabling said transporter to be lifted to and from a vehicle;
   (d) means operatively connected to said base frame for engaging said guide members of a second said transporter, wherein said transporters may be securely stacked; and
   (e) wherein said base frame includes winching means for securing said tubulars within said transporter.

2. The transporter of claim 1, wherein said means for enabling said transporter to be lifted comprises a plurality of apertures formed in gussets connected to said guide members.

3. The transporter of claim 1, wherein said means for enabling said transporter to be lifted comprises at least two of said cross members being constructed in the form of a tube shaped and dimensioned to permit the insertion of a fork of a forklift.

4. The transporter of claim 1, wherein said main beams are constructed from I-beams having upper and lower flanges.

5. The transporter of claim 1, wherein said cross members are constructed from I-beams.

6. The transporter of claim 1, wherein said means for engaging includes a plurality of stacking sockets aligned with and formed to receive said guide members of said second transporter, and wherein each of said guide members of said transporters includes a tapered cap shaped and dimensioned to enable insertion of said guide members into said plurality of stacking sockets.

7. The transporter of claim 1, wherein said guide members are constructed from rectangular tubing.

8. The transporter of claim 1, wherein each of said guide members includes channel means for receiving divider members between stacks of said tubulars.

9. The transporter of claim 1, further including a floor substantially covering the areas defined by said main beams and said cross members wherein said floor comprises a plurality of wooden planks attached to said cross members.

10. The transporter of claim 1, wherein said side support pads are constructed from an elastomeric material.

11. The transporter of claim 1, wherein said winching means for securing said tubulars comprises one or more winches positioned on one of said main beams, said winch including a strap connectable to a location on the other said main beam.

12. The transporter of claim 11, wherein said strap includes a hook connectable to a bracket on one of said main beams.

13. The transporter of claim 4, wherein said I-beams are reinforced with a plurality of gussets extending between said upper and lower flanges.

14. The transporter of claim 1, wherein said transporter is constructed substantially of steel and in a manner to impart a maximum level of rigidity to said transporter.

15. The transporter of claim 1, wherein the length, width and height of said transporter are sized to permit placement of said transporter onto a conventional flatbed trailer.

16. The transporter of claim 1, wherein the maximum length of said transporter does not exceed thirty feet.

17. The transporter of claim 1, wherein said winching means comprises a winching assembly mounted underneath an inverted U-shaped bracket attached to one of said main beams.

* * * * *